United States Patent
Pellet et al.

(10) Patent No.: US 7,387,748 B2
(45) Date of Patent: Jun. 17, 2008

(54) ANTIFREEZE COOLANT COMPOSITION FOR HIGH TEMPERATURE APPLICATIONS

(75) Inventors: Regis Joseph Pellet, Croton-on-Hudson, NY (US); Paul Otto Fritz, Newburgh, NY (US); Leonard Sherman Bartley, Jr., Newburgh, NY (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 10/307,683

(22) Filed: Dec. 2, 2002

(65) Prior Publication Data
US 2004/0104375 A1    Jun. 3, 2004

(51) Int. Cl.
*C09K 50/00* (2006.01)
(52) U.S. Cl. .............................. 252/73; 252/75; 252/76
(58) Field of Classification Search .................. 252/73, 252/74, 75, 76, 77, 78.1, 79; 106/13
See application file for complete search history.

(56) References Cited

U.S. PATENT DOCUMENTS

| | | | |
|---|---|---|---|
| 4,209,415 A * | 6/1980 | Hirozawa et al. | 252/76 |
| 4,210,548 A * | 7/1980 | Hirozawa et al. | 252/76 |
| 4,210,549 A * | 7/1980 | Hirozawa et al. | 252/76 |
| 4,234,440 A * | 11/1980 | Hirozawa et al. | 252/76 |
| 4,241,011 A * | 12/1980 | Hirozawa et al. | 422/13 |
| 4,241,012 A * | 12/1980 | Hirozawa et al. | 422/13 |
| 4,241,015 A * | 12/1980 | Hirozawa et al. | 422/13 |
| 4,241,016 A | 12/1980 | Hirozawa et al. | |
| 4,460,478 A | 7/1984 | Mohr et al. | |
| 5,085,793 A | 2/1992 | Burns et al. | |
| 5,387,360 A * | 2/1995 | Uekusa et al. | 252/73 |
| 5,711,894 A * | 1/1998 | Miyake et al. | 252/76 |
| 5,718,836 A | 2/1998 | Nakatani et al. | |
| 5,851,419 A | 12/1998 | Miyake et al. | |

FOREIGN PATENT DOCUMENTS

| | | |
|---|---|---|
| EP | 0348303 A1 | 12/1989 |
| RO | 115535 B | 4/1999 |
| RU | 2050397 C1 | 12/1995 |

* cited by examiner

*Primary Examiner*—Necholus Ogden
(74) *Attorney, Agent, or Firm*—Steven R. Ellinwood

(57) ABSTRACT

The present invention comprises an improved antifreeze coolant composition with certain additives that serve to increase the thermal stability of the glycol component of a glycol/water coolant composition and to reduce the tendency of the glycol component to degrade under elevated thermal conditions. These additives comprise organic compounds with a carboxylic acid moiety and a hydroxyl moiety, and also tricarballylic acid. Another aspect of this invention concerns a method for improving the stability of the glycol component of a glycol/water coolant composition in engine cooling/heating systems by formulating a glycol/water coolant composition with the thermal stability additive to form an improved coolant composition, and contacting the engine cooling/heating system with the improved coolant composition.

8 Claims, No Drawings

ANTIFREEZE COOLANT COMPOSITION FOR HIGH TEMPERATURE APPLICATIONS

BACKGROUND OF THE INVENTION

1. Field of the Invention

The present invention relates to an engine antifreeze coolant composition which improves the thermal stability of the glycol component of a glycol/water coolant composition in engine cooling/heating systems.

2. Background of the Invention

It is well known to use heat transfer fluids in heat exchanging systems, such as the central heating circuits and engine cooling systems of internal combustion engines and diesel engines. Generally, the heat transfer fluid contacts various metals, alloys and other components that form the different parts of the heat exchanging circuits in these systems. Most typically, coolants that are used in the internal combustion engines and heavy duty diesel engine applications are relied upon to remove the excess heat produced by the internal combustion process.

The coolants, which are also referred to as antifreeze compositions, usually comprise a water-soluble organic fluid to lower the freezing point of the heat transfer fluid. The water-soluble organic fluid is also referred to as an organic freezing point depressant. This water-soluble organic fluid is typically a glycol, for example, monoethylene glycol or monopropylene glycol. Other equivalent glycols can also be used, such as 1,3-butylene glycol, hexylene glycol, diethylene glycol, glycerin, dipropylene glycol and 1,3propanediol. Corrosion inhibitors are also generally added to the antifreeze compositions.

Glycol-based antifreeze compositions are generally diluted with water in order to prepare a ready-to-use aqueous heat transfer fluid. The weight ratio of the amount of the organic freezing point depressant component to that of water in the antifreeze composition is determined by the desired freezing point temperature of the antifreeze composition. Specific combinations of water and organic freezing point depressant components are chosen for desired heat transfer, freezing point and boiling point properties.

Antifreeze coolant compositions also contain additives to prevent corrosion, foaming and scale formation, as well as dyes for fluid identification purposes, and buffering agents to control the pH of the composition.

A current trend in engine manufacture is toward higher efficiency and reduced environmental impact. Higher efficiency can be achieved by increasing power output while reducing engine size and weight. This in turn has the effect of increasing the thermal load to the engine cooling system while often reducing the volume of the cooling system. Such changes result in higher coolant operating temperatures. However, gains in efficiency are often accompanied by increased degradation of the coolant.

The antifreeze coolant composition can degrade in a number of ways. Higher temperatures can accelerate the depletion of the coolant's corrosion inhibitors, prematurely shortening the useful life of the coolant. Thus, corrosion inhibitors which undergo chemical reaction to protect metal surfaces can undergo reaction at accelerated rates at elevated temperatures. For example, nitrite inhibitors added to protect cast iron typically convert to nitrate in use and will convert the iron surfaces to a passivated state. Higher temperatures will accelerate the conversion of nitrite to nitrate, resulting in inhibitor depletion followed by reduced iron surface protection and increased iron corrosion. Ultimately, coolant life is shortened.

Moreover, the coolant base fluid, often composed of glycols can itself degrade to glycol breakdown products such as formate and glycolate through a process of oxidation, perhaps catalyzed by metal surfaces. These oxidation products tend to be acidic and can themselves attack cooling system components. Thus, the presence of glycolates and formates can enhance iron corrosion processes.

Prior art automotive and heavy-duty coolant technology was designed for use at temperatures that typically ranged from about 180-220° F., while heat rejecting surfaces that emanate heat and need to be cooled, such as the engine block, turbo chargers, exhaust gas coolers and fuel injectors, can develop surface temperatures which contact the coolant that range from about 230° F. to about 275° F. As trends continue, it is expected that coolant operating temperatures will increase to greater than 230° F. and that the temperature of the heat rejecting surfaces can be on the order of about 450° F. to about 600° F.

At the temperatures for which they were designed, prior art coolants resist metal corrosion by means of inorganic or carboxylate inhibition. They are also effective to some extent at buffering against the deleterious effects of acidic glycol breakdown products. However, at the anticipated increase in operating temperatures of automotive cooling systems, prior art corrosion protection, inhibitor depletion and glycol stability can be negatively impacted.

U.S. Pat. No. 5,851,419 to Miyake et al discloses an antifreeze composition containing a succinic acid derivative in combination with a benzoic acid derivative to provide improved corrosion protection and greater buffering capacity. Improved buffer capacity is exemplified by titrating the antifreeze composition with acid and noting that increased acid is needed to reduce the pH of the coolant. When glycol degrades to acidic product, the composition will resist pH drop due to enhanced buffer capacity.

U.S. Pat. No. 4,241,016, to Hirozawa discloses a process of inhibiting the corrosion of metals, especially aluminum, using hydroxybenzoic acids as corrosion inhibitors in combination with an organosiloxane silicate copolymer and pH buffering agents capable of buffering in the pH range of 9 to 11.

U.S. Pat. No. 4,460,478, to Mohr et al. discloses a coolant composition containing an orthosilicate ester in a pH range of 6 to 8 containing between 25 to 4000 ppm silicon. Mohr also discloses hydroxybenzoate as a corrosion inhibitor.

U.S. Pat. No. 5,085,793, to Burns et al discloses an antifreeze composition wherein hydroxybenzoates are used for corrosion protection. The antifreeze composition comprises glycol and at least one hydroxyl-substituted aromatic carboxylic acid, having the carboxyl radical proximate to the hydroxyl radical. Also disclosed is a process for inhibiting metal corrosion. The corrosion inhibitor comprises hydroxybenzoate and at least one of borates, silicates, benzoate, nitrates, nitrites, molybdates, thiazoles, and a aliphatic diacid or its salt.

U.S. Pat. No. 5,718,836 to Nakatani discloses a coolant composition containing calcium and/or magnesium salts as well as other corrosion inhibitors, including benzoates.

European patent 0 348 303 discloses improved corrosion protection at elevated temperatures from the addition of salicylate or acetylsalicylate to glycol based antifreeze coolants. The examples show increased pH in comparative coolants when thermally aged due to the formation of basic degradation products. The addition of salicylate appears to repress increase in basicity as indicated by the repressed pH rise during thermal treatment. Repression of metal corrosion is also noted. Although pH rise is undesirable because it indicates metal corrosion, a pH drop also is a matter of concern because an overly acid coolant will itself induce corrosion of metal to which it is exposed. Therefore, preventing the formation of acidic products is an important and different function than prevention of metal corrosion.

U.S. Pat. No. 5,387,360 to Uekusa et al discloses an antifreeze coolant composition comprising glycols as the main constituent, for example, ethylene glycol, propylene glycol, 1,3-butylene glycol, hexylene glycol, diethylene glycol and glycerin. Uekusa's water-free antifreeze composition also includes at least one conventional corrosion inhibitor except silicates, and about 0.005 weight % to about 0.5 weight % of citric acid and/or its corresponding salts.

Uekusa discloses that when an organic acid other than citric acid and its salts, or a tribasic acid, or a dibasic acid is employed in place of citric acid, the resulting coolant has little corrosion inhibiting effect, whether or not the organic acid has a hydroxyl group in the molecule. Uekusa also notes that when the amount of citric acid or its corresponding salts are less than 0.005 weight %, the resulting coolant does not have a satisfactory corrosion preventing effect on metallic materials such as aluminum alloys, resulting in increased weight loss of metallic materials due to corrosion. Uekusa further notes that when the concentration of citric acid or its corresponding salts is greater than 0.5 weight %, the resulting coolant does not have desirable corrosion preventing properties, resulting in increased weight loss of cast aluminum test pieces due to corrosion. The surface of the cast aluminum alloys also turns black. Uekusa does not address the influence or effect of citric acid and its corresponding salts or other additives in a glycol/water antifreeze coolant composition on glycol stability in high temperature applications.

SUMMARY OF THE INVENTION

The present invention comprises an improved antifreeze coolant composition with certain additives that serve to increase the thermal stability of the glycol component of a glycol/water coolant composition and to reduce the tendency of the glycol component to degrade under elevated thermal conditions. These additives comprise organic compounds with a carboxylic acid moiety and a hydroxyl moiety, and also tricarballylic acid. Another aspect of this invention concerns a method for improving the stability of the glycol component of a glycol/water coolant composition in engine cooling/heating systems by formulating a glycol/water coolant composition with the thermal stability additive to form an improved coolant composition, and contacting the engine cooling/heating system with the improved coolant composition.

DESCRIPTION OF THE PREFERRED EMBODIMENTS

In accordance with the present invention, it has been found that the high temperature stability of glycol-based antifreeze coolant compositions can be enhanced by the addition of certain additives comprising organic compounds with a carboxylic acid moiety and a hydroxyl moiety, and also tricarballylic acid. Examples of such additives include alkali salts of the mono-, di- and trihydroxy benzoic acids and their derivatives. These include but are not limited to the salts of salicylic acid, acetylsalicylic acid, the resorcylic acids and gallic acid.

Monohydroxy benzoic acids include salicylic acid (2-hydroxybenzoic acid), 3-hydroxybenzoic acid, and 4-hydroxybenzoic acid.

Dihydroxybenzoic acids include 2,3-dihydroxybenzoic acid, 2,4-dihydroxybenzoic acid, 2,5-dihydroxybenzoic acid, 2,6-dihydroxybenzoic acid, 3,4-dihydroxybenzoic acid, and 3,5-dihydroxybenzoic acid.

Trihydroxybenzoic acids include gallic acid (3,4,5-trihydroxybenzoic acid) and 2,4,6-trihydroxybenzoic acid.

Benzenediols include 1,2-benzenediol (pyrocatechol), 1,3-benzenediol (resorcinol), and 1,4-benzenediol (p-hyroquinone).

Especially effective are the alkali salts of tricarboxylic acids such as citric, isocitric and tricarballylic acids.

It has been found that such additives improve coolant stability as evidenced by decreased inhibitor depletion and reduced glycol degradation. The beneficial effects of the present invention are applicable to glycol/water antifreeze coolants which rely on organic inhibitor technology as well as inorganic inhibitor technology. Organic inhibitor technology depends upon carbon based, organic additives such as carboxylate salts for corrosion protection. Inorganic inhibitor technology depends upon inorganic additives such as silicate, phosphate and borate for corrosion inhibition and buffering effects.

The additives can be present in amounts which vary from about 0.01 to about 5 weight %, based on the overall glycol/water composition, and preferably about 0.05 to about 1.5 weight %. The additives are present as neutralized alkali metal salts if they possess a carboxylic or acidic functionality.

Glycol coolant formulations can contain a weight ratio of water to glycol which varies from about 95:5 to about 5:95, respectively. However, most glycol coolant formulations will contain a ratio of water to glycol which varies from about 60:40 to about 40:60 respectively.

The present invention has discovered that such high temperature stability improving additives in antifreeze compositions provide beneficial effects upon the rate of glycol degradation in a water based glycol coolant at elevated temperature. The results are most effective when the amount of additive component varies from about 0.05 weight % to about 1.5 weight % in a water based glycol antifreeze composition comprising about 40 weight % to about 60 weight % glycol. Other known ingredients such as corrosion inhibitors, antifoams, scale inhibitors, dyes and buffering agents to control the pH of the composition can also be included. The pH of the present invention can vary from about seven to about 11. In one embodiment of the present invention the pH was adjusted to about 8.0 (Table 2).

The following examples demonstrate the efficacy of the invention on glycol stability as evidenced by resistance to breakdown to acid products under thermal treatment. All parts and percentages are by weight unless otherwise noted.

EXAMPLE 1

150 grams of ethylene glycol and 150 grams of water were mixed to produce a 50 weight % ethylene glycol solution in water. The pH of the glycol/water solution was adjusted to 10 by the addition of 45% potassium hydroxide solution. Ten separate 30 gram glycol/water solution portions were divided out. Eight of the solutions were each mixed with 0.0226 gram moles of an additive listed in Table 1. These solutions are referred to as "additized solutions". No additives were mixed in the two remaining 30 gram glycol/water solutions.

Each additized solution was again adjusted with 45% potassium hydroxide to a pH in the range of 10-11, which is typical of fresh unaged glycol/water automotive coolants. The pH adjustment converted each acidic additive to the corresponding alkali salt.

The thermal stability of each solution was evaluated by placing 20 grams of each additized glycol/water solution and one non-additized glycol/water solution in separate Teflon® lined Parr reactors (Parr, Inc.). Each solution was also mixed with 3 grams of powdered iron. The Parr reactors were sealed and placed in an oven at 450° F. and aged for 8 days. At the end of this period, the reactors were cooled and opened, and the aged samples were collected and analyzed on a High Pressure Liquid Chromatograph ("HPLC") Model 1050 (Hewlett Packard Co.). Also analyzed was the unaged additive-free glycol/water solution.

Each sample was eluted for approximately 38 minutes through the HPLC. Samples of each fresh and each aged solution were analyzed by this method. The unaged additive-free glycol/water sample was free of decomposition components which register as peaks on the HPLC chromatogram. The aged additive-free glycol/water sample exhibited four major decomposition peaks attributable only to the thermal degradation of ethylene glycol in the presence of the powdered iron at elevated temperatures. Iron powder was added to simulate the action occurring in the cooling system of an automotive engine with heat rejecting surfaces such as the cast iron surface of an operating automotive engine.

The four major decomposition peaks in the non-additized ethylene glycol solution on the HPLC chromatogram occurred at retention times of 5.26, 8.54, 11.74 and 31.46 minutes, respectively. Analysis of each of the fresh, additized solutions were found to have no component peaks in the areas of these decomposition peaks. Thus these four peaks were selected based on minimal interference from the additives of the present example. The same four peaks were found however, to varying extent in all of the aged additized solutions and were used to indicate the extent of ethylene glycol degradation that occurred during thermal aging in the presence of the various additives of this example. Specifically, the total "counts" of the four peaks are integrated unitless areas attributed to each degradation component and serve as useful indicators of the extent of ethylene glycol degradation. The integrated areas for non-additized ethylene glycol in water as well as the other test solutions are summarized in Table 1.

TABLE 1

Aged 50% Glycol/Water Solutions

| Additive | HPLC 4 Peak Area (counts) | Additive Weight (grams) | gram-moles/ 1000 grams |
|---|---|---|---|
| none | 984 | — | — |
| tricarballyic acid | 192 | 0.036 | 0.0226 |
| gallic acid | 244 | 0.035 | 0.0226 |
| acetylsalicylic acid | 265 | 0.037 | 0.0226 |
| sodium salicylate | 540 | 0.034 | 0.0226 |
| sodium citrate | 952 | 0.062 | 0.0226 |
| sodium tartarate | 979 | 0.049 | 0.0226 |

The non-additized ethylene glycol/water solution with a total peak area of 984 counts provided a basis in which to evaluate the effect of each additive on the thermal stability of the glycol component. The data indicates that the thermal stability improving additives such as tricarballyate, citrate, gallate, acetylsalicylate and salicylate were particularly effective in repressing glycol breakdown or degradation as indicated by the reduced counts of the four peak HPLC areas of the additized glycol solutions.

EXAMPLE 2

Coolant compositions were prepared by diluting with water an organic acid technology glycol-based, commercial coolant concentrate from Chevron sold as Delo™ Extended Life Coolant/Antifreeze to obtain a 50 weight % solution of the commercial coolant concentrate in water having a pH of about 8. Additives of the present invention were added to the coolant composition to yield an additive concentration of 0.0226 gram moles per 30 grams of coolant.

Additives were added either as their alkali metal salt of the corresponding substituted benzoic acid. If the additives were added as the acid, the resulting solution pH was adjusted by the addition of potassium hydroxide solution so that the final pH approximated that of the unadditized coolant, that is about 8.

The pH and the reserve alkalinity of all solutions were measured in their fresh states and these results appear in Table 2. Reserve alkalinity was determined by titrating 10 cc of each solution, diluted to 100 cc with deionized water, with 0.1N hydrochloric acid until a solution pH of 5.5 was obtained. The reserve alkalinity was recorded as the volume of HCl solution needed to achieve the 5.5 pH. Again initial results are recorded in Table 2.

Thirty grams of each solution were placed in 125 ml Teflon® lined Parr reactors and sealed. An additional 30 gram portion of 50 weight % solution of the commercial coolant was also placed in a Parr reactor for comparative purposes. The sealed reactors were placed in an oven at 400° F. and maintained at that temperature for 40 hours. The reactors were cooled and the thermally aged coolant samples were analyzed for pH and for reserve alkalinity. Final reserve alkalinity and final pH results for the aged coolants also appear in Table 2.

From the data in Table 2, the 50 weight % solution of the commercial coolant with no additive had an initial pH of 7.8 and a reserve alkalinity of 2.06. After aging, the non-additized 50 weight % solution of the commercial coolant had a pH of 6.75 and a reserve alkalinity of 1.37. Degradation of the ethylene glycol component of the 50 weight % solution of the commercial coolant generated acidic degradation products which caused the pH of coolant to decrease and also reduced the reserve alkalinity of the aged 50 weight % solution of the commercial coolant.

From the data in Table 2, it can also be seen that the 50 weight % solutions of the commercial coolant which were additized with hydroxybenzoates or their derivatives, present as the sodium salt, were prepared so that their intial pH values were nearly the same as that of the non-additized 50 weight % solutions of the commercial coolant, or about 8. More importantly, the coolants modified with the additives of the present invention had reserve alkalinities of about 2, approximately equivalent to the non-additized 50 weight % solutions of the commercial coolant comparative example. This signifies that the additives used in the present invention did not increase the buffer capacity of the coolants since there was no increase in reserve alkalinity.

TABLE 2

Thermal Aged, Additized 50 weight % Commercial Coolant: pH and Reserve Alkalinity Properties

| Additive | Initial pH | Initial Reserve Alkalinity | Final pH | Final Reserve Alkalinity |
|---|---|---|---|---|
| None | 7.8 | 2.06 | 6.75 | 1.37 |
| Salicylate | 7.87 | 2.06 | 6.95 | 1.83 |
| Acetylsalicylate | 7.84 | 2.08 | 6.79 | 1.75 |
| 4-hydroxybenzoate | 8.1 | 2.13 | 6.98 | 2.05 |

TABLE 2-continued

Thermal Aged, Additized 50 weight % Commercial Coolant: pH and Reserve Alkalinity Properties

| Additive | Initial pH | Initial Reserve Alkalinity | Final pH | Final Reserve Alkalinity |
|---|---|---|---|---|
| Acetylbenzoate | 8.24 | 2.22 | 6.79 | 1.57 |
| 2,4-dihydroxybenzoate | 8.03 | 2.5 | 7.18 | 2.44 |
| 2,6-dihydroxybenzoate | 8.06 | 2.3 | 7.00 | 2.2 |

After thermal aging of these coolants, a somewhat smaller pH drop was observed. More importantly, the reserve alkalinity of the coolants of the present invention remained significantly higher. Thus, the 50 weight % solutions of the commercial coolant modified with 4-hydroxybenzoate, as the sodium salt, had an initial reserve alkalinity before aging of 2.13. After aging it maintained a reserve alkalinity of 2.05, virtually unchanged. While the initial reserve alkalinity of the 4-hydroxybenzoate modified 50 weight % solution of the commercial coolant was the same as the non-modified 50 weight % solution of the commercial coolant, which indicated comparable buffer capacity, the aged reserve alkalinity of 2.05 was significantly greater than that of the aged non-additized 50 weight % solution of the commercial coolant with a reserve alkalinity of 1.37. This demonstrates that far fewer acidic glycol breakdown products formed upon thermal aging of the coolant of the present invention. Note that with 4-hydroxybenzoate, the hydroxy moiety is not proximate to the carboxylate moiety on the benzene ring. To varying degrees similar improvements were observed for all other additives in Table 2.

It appears that the multiple hydroxylated benzoates were even better than the single hydroxy substituted benzoates in stabilizing coolant against thermal degradation as indicated by improved reserve alkalinity properties. The triply substituted hydroxybenzoates, such as the alkali salt of gallic acid were even more effective as shown in Table 1.

EXAMPLE 3

Thermal aging of glycol/water solutions causes acidic breakdown products formed from the degradation of ethylene glycol. The amount of these acid products can be quantified by titration with base and the quantification can be used as a measure of the extent of glycol degradation. In the following experiments, water/glycol solutions were thermally aged and then titrated to quantify the extent of thermal degradation in the presence of and in the absence of an additive of the present invention.

A water/glycol solution was prepared by mixing 50.0 grams of deionized water with 50.0 grams of ethylene glycol to yield a 50 weight percent solution of ethylene glycol in water. A 50.0 gram portion of this 50% solution was treated by dissolving in it 0.054 grams of sodium salicylate. The pH of this solution and the non-additized portion were adjusted to 11.0 using a potassium hydroxide solution. The pH of each solution was adjusted so that each solution would have the same acid/base content prior to thermal aging.

Each solution was thermally aged as follows. A thirty gram portion of the water/glycol mixture was added to one Teflon® lined Parr reactor while another thirty gram portion of the salicylate/water/glycol solution was added to a second Teflon® lined Parr reactor. Both reactors had a 125 ml capacity. Both reactors were sealed and placed in an oven at 400° F. for 15 hours.

After thermal treatment, the reactors were cooled and the pH of each aged solution was measured and listed in Table 3. The pH of the water/glycol solution dropped from 11.0 to 2.01 due to the formation of acids from glycol degradation. The pH of the salicylate/water/glycol solution also dropped but only to a pH of 3.74. Since pH is a logarithmic scale, the 1.73 unit difference in acidity represents a nearly 100 fold difference in acidity.

In order to determine the amount of acid products formed, each solution was titrated by adding a base solution, 0.1N sodium hydroxide in water until the resulting pH returned to the initial solution pH of 11. The amount of base added was equivalent to the amount of degradation acid formed when the solution pH was returned to its starting value, that is, all acid products were neutralized. The results of these titrations are summarized in Table 3.

TABLE 3 pH and Acid Content: Ethylene Glycol Solutions

| Solution | Initial pH | pH, Aged Solution | Titration, Volume of 0.1N Base* |
|---|---|---|---|
| Ethylene glycol/water | 11.00 | 2.01 | 9.88 |
| Sodium salicylate/glycol/water | 11.01 | 3.74 | 3.96 |

*volume of potassium hydroxide (KOH) required to restore pH to 11

The titration data indicate 9.88 ml of 0.1N sodium hydroxide solution were needed to restore the pH of the non-additized ethylene glycol water solution to its initial pH value of 11.00. In contrast, only 3.96 ml of base were needed to return the solution of the present invention to its initial pH. Again, the volume of base needed to neutralize the acid degradation products is an exact measure of the amount of ethylene glycol degradation that occurred. The data of Table 3 indicate that acid production was reduced by more than a factor of two for the solution of the present invention. Unlike the prior art where additional additives are required to obtain increased buffer capacity or increased corrosion resistance, this example demonstrates that the additives of the present invention are effective without additional components to repress glycol degradation.

EXAMPLE 4

Three coolant compositions were prepared to demonstrate the unexpected effect of increasing the additive citrate content beyond the level disclosed in U.S. Pat. No. 5,387,360 to Uekusa. The first coolant composition was prepared by diluting with water an organic acid technology glycol-based coolant concentrate available commercially from Chevron as Delo™ Extended Life Coolant to obtain a 50 weight % solution of the commercial coolant concentrate in water. The 50 weight % or 50:50 water/glycol commercial coolant solution was then used to prepare two additional coolant compositions. The second coolant composition was modified by adding 0.2 weight % sodium citrate to the 50:50 water/glycol coolant solution. This coolant represents a composition within the scope of the Uekusa patent because on a water-free basis the second coolant composition would contain 0.4 weight percent sodium citrate. The third coolant composition was modified by adding 0.4 weight percent sodium citrate to the 50:50 water/glycol solution which would be equivalent to 0.8 weight percent sodium citrate in a water-free glycol concentrate. The third coolant composition with the sodium citrate additive is outside the scope of the 0.5 weight % maximum concentration on a water-free basis disclosed in the Uekusa patent.

The three coolant compositions were evaluated for glycol stability using a modified ASTM 4340 test. The ASTM 4340 Hot Surface Test is designed to measure corrosion rates on an electrically heated aluminum surface exposed to coolant. In this test an aluminum coupon was heated to 275° F. and exposed to the test coolant diluted to 25% concentration with corrosive water containing chloride. Measurement of the aluminum coupon weight before and after exposure to coolant for a 1 week period yields a weight loss measurement which is directly related to the high temperature aluminum corrosion rate.

For purposes of demonstrating the advantages of the current invention, the ASTM 4340 test was modified by replacing the aluminum coupon in the test apparatus with a cast iron coupon to allow accelerated aging of coolant. Cast iron was employed to simulate typical engine block surfaces where some of the highest engine temperatures are encountered. The modifications were made to obtain information about the stability of the coolant's inhibitors and the coolant's glycol component at elevated temperature conditions to accelerate degradation.

The coupon assembly was placed on top of the electrical heating unit in the test apparatus of ASTM 4340. A cylindrical glass reservoir was placed above the coupon assembly. The glass reservoir and the coolant passage were then filled with 500 grams of coolant to be evaluated at a pressure of 25-30 psig. The coupon was then heated to a temperature of 275° F. and maintained at that temperature for 500 hours, or approximately 3 weeks. The 275° F. test temperature was selected to accelerate thermal degradation which occurs over hot metal surfaces in real world applications.

Each of the three coolant compositions described above were aged in the modified ASTM 4340 apparatus by exposing the coolant to the cast iron assembly, heated to 275° F. for 500 hours at pressures ranging from 25 to 30 psi. Following aging, the aged coolant was analyzed for inhibitor content, pH, reserve alkalinity (RA) and for the typical glycol breakdown products, glycolate and formate. The presence of glycolate and formate indicates degradation or breakdown of the glycol coolant component due to thermal and/or oxidative treatment.

This modified test yielded information on glycol breakdown or degradation induced by exposure of the coolant to the cast iron coupons heated to 275° F. over the 500 hour test period. The test yielded information regarding changes to the coolant pH and to the coolant reserve alkalinity. Both of these parameters changed as a result of glycol degradation.

As glycol degrades, acidic degradation products, such as glycolic and formic acid were generated resulting in a decrease in coolant pH as well as a decrease to coolant reserve alkalinity. Reserve alkalinity is measured by titration with 0.1N hydrochloric acid and is the volume in milliliters of acid needed to titrate 10 milliliters of coolant to a pH of 5.5. This increased acidity is to be avoided because of the detrimental effect it has on cooling system components. At reduced pH, acid attack on metal and elastomeric parts becomes a significant cause of degradation.

The results obtained in evaluating the three coolant compositions described above in the modified ASTM 4340 test are summarized in Table 4.

TABLE 4

| Base Coolant | weight % Citrate in Concentrate | Reserve Alkalinity after Aging (volume, ml of 0.1N HCl) | pH after Aging | Aluminum Corrosion Current (micro amps) |
| --- | --- | --- | --- | --- |
| 50 weight % water/glycol commercial solution | 0.00% | 2.3 | 7.1 | 2.19 |
| | 0.40% | 3.8 | 8.18 | 3.59 |
| | 0.80% | 5.2 | 8.66 | 2.67 |

The 50 weight % solution of the commercial coolant, with no citrate added, had a reserve alkalinity of about 6 and a pH of about 8.3 in its fresh state, before testing.

As seen from Table 4, when citrate content was raised from 0 to 0.4 to 0.8 weight percent, the reserve alkalinity maintained by the aged coolant increased from 2.3 to 3.8 to 5.2. For the same series, Table 4 shows that the coolant pH after aging increased from 7.1 to 8.2 to 8.7. Fresh, unused 50 weight % solution of the commercial coolant had a reserve alkalinity of about 5-6.0 and a pH of about 8-8.5. The data indicate that the 50 weight % solution of the commercial coolant without citrate and the 50 weight % solution of the commercial coolant with 0.4% citrate significantly reduced pH and reserve alkalinity. The 50 weight % solution of the commercial coolant with 0.8% citrate maintained a pH and reserve alkalinity equivalent to unused 50 weight % solution of the commercial coolant, indicating far less degradation.

The glycol stabilization achieved by the present invention is not disclosed in the Uekusa patent.

The Uekusa patent teaches away from coolant compositions containing more than 0.5 weight percent citrate on a water-free basis. According to Uekusa, the ability to protect against corrosion is negatively impacted at higher citrate levels.

This example demonstrates that when citrate was added to an organic additive coolant, the resultant coolant had improved resistance to glycol degradation. More importantly, this example showed the unexpected beneficial effect of elevated citrate concentrations on glycol stabilization.

Coolants containing citrate at concentrations outside the range disclosed in the Uekusa patent were shown to be superior to coolants containing citrate within the range disclosed by Uekusa. The Uekusa patent does not disclose advantages for glycol or for elastomers when using coolants with citrate additives. These benefits are obtained without adversely affecting other coolant properties. Surprisingly, the aluminum corrosion resistance of a coolant containing citrate in excess of the level claimed in the Uekusa patent, as measured by aluminum corrosion current in Table 4, was actually better than the aluminum protection afforded by using citrate at levels specified by Uekusa.

EXAMPLE 5

The electrochemical techniques detailed in ASTM D 6208-97 "Test Method for Repassivation Potential of Aluminum and Its Alloys by Galvanostatic Measurement" are generally used in the industry to evaluate the ability of metallic surfaces to resist pitting corrosion. Metal corrosion is electrolytically accelerated in ASTM D 6208-97 in an anodic process wherein metal is oxidized to metal ions and the metal surface becomes pitted in a fashion similar to the pitting which occurs during the corrosion process.

At a given or constant applied potential, the metal surfaces which exhibit increased current will also exhibit increased pitting corrosion. Thus the current observed at an aluminum electrode immersed in coolant under applied potential will indicate the extent of corrosion induced by the applied potential. Metallic surfaces exhibiting increased current will be corroding at a faster rate. Conversely, surfaces protected by the coolant inhibitors will exhibit reduced current relative to an unprotected surface.

The three coolant compositions prepared in Example 4 were replicated to evaluate their ability to protect aluminum against corrosion. Aluminum coupons or electrodes commercially available from Metal Samples, Inc., having an exposed surface area of 1.0 cm² were prepared from aluminum 3003 alloy and were cleaned and polished with 600 mesh sand paper to remove surface coatings and to prepare a reproducible surface for evaluation. The aluminum coupons thus prepared were placed in a cellholder available as EG&G's ⅝ inch Teflon® disk holder and immersed in each of the three replicated test coolants prepared in Example 4.

Test solutions were prepared by further diluting each of the three test coolant compositions with ASTM D-1384 corrosive water containing 100 ppm portions of sulfate, chloride and bicarbonate ions introduced as sodium salts. The final solution contained about 17 weight % of the original glycol concentrate.

Dilution of the corrosion inhibitor is necessary to enhance the severity of this test and to magnify difference in inhibitor performance. Specifically, the corrosive ions present in the corrosive water accelerate the pitting of the aluminum specimen immersed in the coolants of this example. The coolants that offer improved corrosion protection will better resist pitting tendencies caused by the presence of the corrosive water. Those coolants with improved corrosion protection will exhibit reduced electrical current and improved corrosion protection.

The cell holder with the aluminum coupon was electrically connected to the anodic (positive) terminal of a potentiometer while a graphite working electrode was connected to the cathodic (negative) terminal. The potentiometer was used to apply a precisely controlled potential (voltage) between the metal test specimen, that is, the aluminum electrodes and the graphite electrode.

For purposes of studying the corrosion tendencies in the coolants of this example, a positive charge was applied to the aluminum electrode (anode) relative to the graphite counter electrode (cathode). A standard calomel electrode was also used and served as a reference against which, the precise potential of the aluminum electrode was measured.

In addition to measuring the potentials or voltage differences, the potentiometer measured the current generated between two electrodes as the potential or voltage was applied. The amount of current generated is a measure of the amount of corrosion occurring at the aluminum surface.

When the coolants provided improved corrosion protection, the aluminum electrode exhibited reduced current at a controlled, applied potential, thereby showing improved corrosion protection.

Each aluminum coupon was allowed to equilibrate by placing it in each of the three test solutions for thirty minutes. After equilibration, the anodic potential of the aluminum was increased relative to the graphite cathode. The anodic potential was increased to +0.1 volts greater than the open circuit potential of the aluminum electrode immersed in each test solution. The open circuit potential is the potential observed relative to a standard calomel electrode when the aluminum electrode is immersed in the test coolant with no applied potential. The open circuit potential is the potential observed when the aluminum electrode is at equilibrium with the coolant environment in which it is immersed. The actual potential of the anode was determined by comparison to a saturated calomel electrode.

Table 4 in Example 4 lists anodic currents in microamps for aluminum coupons immersed in each of the three test solutions at 0.1 volts above the open circuit potential of each coupon.

As a 0.1 volt anodic potential was applied, current was induced and corrosion began. The rate of corrosion is indicated by the amount of current induced. As the coolant citrate level was raised from 0 to 0.4% to 0.8% the corrosion current varied from 2.2 to 3.6 to 2.7 microamps. This is an extremely small current and is relatively the same for all three solutions. This indicates that for coolants of the present invention, aluminum corrosion protection was not impaired by the presence of citrate in excess of the range claimed by the Uekusa patent.

What is claimed is:

1. A thermally stable coolant composition having a pH from about 7.8 to about 11.1 and consisting of water and a glycol in a weight ratio of about 95:5 to about 5:95 respectively, and about 0.01 weight % to about 5.0 weight % of at least one additive selected from the group consisting of 3-hydroxybenzoic acid; 4-hydroxybenzoic acid; 2,3-dihydroxybenzoic acid; 2,4-dihydroxybenzoic acid; 2,5-dihydroxybenzoic acid; 2,6-dihydroxybenzoic acid; 3,4-dihydroxybenzoic acid; 3,5-dihydroxybenzoic acid; 2,4,6-trihydroxybenzoic acid; isocitric acid; acetylsalicylic acid; resorcylic acid and the alkali salts of each of said acids.

2. The composition of claim 1, wherein the weight ratio of glycol to water is about 50:50.

3. The composition of claim 1, wherein the initial pH varies from about 7.8 to about 9.0.

4. The composition of claim 1, wherein the glycol is at least one selected from the group consisting of monoethylene glycol, monopropylene glycol, 1,3-propylenediol, diethylene glycol, dipropylene glycol, butylene glycol, hexylene glycol and glycerin.

5. A method for improving the high temperature stability of a water and glycol antifreeze coolant composition consisting of the steps of:
    (a) forming a water and glycol antifreeze coolant mixture with a water to glycol weight ratio of about 95:5 to about 5:95 respectively,
    (b) adding to said antifreeze coolant composition about 0.01 weight % to about 5.0 weight % of at least one thermal stability improving additive selected from the group consisting of 3-hydroxybenzoic acid; 4-hydroxybenzoic acid; 2,3-dihydroxybenzoic acid; 2,4-dihydroxybenzoic acid; 2,5-dihydroxybenzoic acid; 2,6-dihydroxybenzoic acid; 3,4-dihydroxybenzoic acid; 3,5-dihydroxybenzoic acid; 2,4,6-trihydroxybenzoic acid; isocitric acid; acetylsalicylic acid; resorcylic acid and the alkali salts of each of said acids,
    (c) adjusting the pH of said antifreeze coolant mixture from about 7.8 to about 11.1.

6. The method of claim 5, wherein the weight ratio of glycol to water is about 50:50.

7. The method of claim 5, wherein the initial pH varies from about 7.8 to about 9.0.

8. The method of claim 5, wherein the glycol is at least one selected from the group consisting of monoethylene glycol, monopropylene glycol, 1,3-propylenediol, diethylene glycol, dipropylene glycol, butylene glycol, hexylene glycol and glycerin.

* * * * *